(12) United States Patent
Poe

(10) Patent No.: US 7,758,770 B2
(45) Date of Patent: Jul. 20, 2010

(54) BINDING AGENT FOR COMPACTED SALT

(75) Inventor: Jerry Poe, Hutchinson, KS (US)

(73) Assignee: North American Salt Company, Overland Park, KS (US)

( * ) Notice: Subject to any disclaimer, the term of this patent is extended or adjusted under 35 U.S.C. 154(b) by 0 days.

(21) Appl. No.: 11/943,306

(22) Filed: Nov. 20, 2007

(65) Prior Publication Data

US 2009/0127502 A1    May 21, 2009

(51) Int. Cl.
*C02F 5/10* (2006.01)
(52) U.S. Cl. .................... 252/181; 252/182.12
(58) Field of Classification Search ............ 252/181, 252/182.12
See application file for complete search history.

(56) References Cited

U.S. PATENT DOCUMENTS 4,539,134 A * 9/1985 Martin et al. ............ 134/40
4,988,513 A * 1/1991 Griffity ................... 424/439
4,992,208 A * 2/1991 Ireland ................... 252/363.5
6,054,160 A * 4/2000 Gawad et al. ............ 426/270

OTHER PUBLICATIONS

Inventor Jerry Poe's Aug. 18, 2008 Declaration Under 37 C.F.R. § 1.56, 1 page.

* cited by examiner

*Primary Examiner*—Ling-Siu Choi
*Assistant Examiner*—Bijan Ahvazi
(74) *Attorney, Agent, or Firm*—Hovey Williams LLP

(57) ABSTRACT

Novel binders and a compacted salt containing those binders are provided. The binders comprise an aqueous solution or dispersion of sorbitol and an alkali metal phosphate. The binder is contacted with salt crystals heated to elevated temperatures. After binder contact, the coated salt crystals are passed through a compactor where elevated temperatures and pressures cause the salt to melt and then recrystallize as a sheet that can be broken into pieces. The final salt product has the binding agent substantially uniformly dispersed therethrough, resulting in a salt that has high strength and is resistant to mushing. The inventive products are particularly useful as a water softening salt.

11 Claims, 2 Drawing Sheets

BINDING AGENT FOR COMPACTED SALT

BACKGROUND OF THE INVENTION

1. Field of the Invention

The present invention is concerned with novel binders for forming compacted salt products for use in water softeners.

2. Description of the Prior Art

Hard water is a common problem and is caused by the presence of high levels of precipitates such as calcium and magnesium. The ion of these metals can cause numerous issues, including lessening the effectiveness of detergents and causing scale build-up in water lines. Water softeners have commonly been used to treat hard water. Conventional water softeners use a salt (e.g., sodium chloride, potassium chloride) and rely on an ion exchange process, whereby the calcium and magnesium hardness ions in the water are replaced with the metal ions of the salt.

A common problem with prior art water softening salt products is that of "mushing." That is, exposure to the aqueous environment of a water softener will cause the salt to soften and dissolve to granules or particles. This reduces the effectiveness of the salt and negatively impacts regeneration of the ion exchange material.

There is a need for improved salt products that avoid problems of prior art salt products.

SUMMARY OF THE INVENTION

The present invention is broadly concerned with a new binder useful for forming a salt product. The binder comprises an aqueous mixture of sorbitol and an alkali metal phosphate (e.g., sodium hexametaphosphate).

The invention also involves a salt product formed by the inventive binder, where the salt product comprises sorbitol and an alkali metal phosphate intermixed with a salt (e.g., NaCl, KCl). This product overcomes the problems in the prior art by minimizing or avoiding mushing and bridging of the salt product.

In another embodiment, the invention includes a method of forming the salt product. In the method, a salt is contacted with the inventive binder to yield binder-coated salt. The binder-coated salt can then be compacted to form a sheet of recrystallized salt having the binder interspersed therein. The sheet is subsequently broken into pieces that can be used in a method of treating hard water by contacting the water with the salt product.

The invention is described in more detail below.

DETAILED DESCRIPTION OF THE PREFERRED EMBODIMENTS

Figure 1:
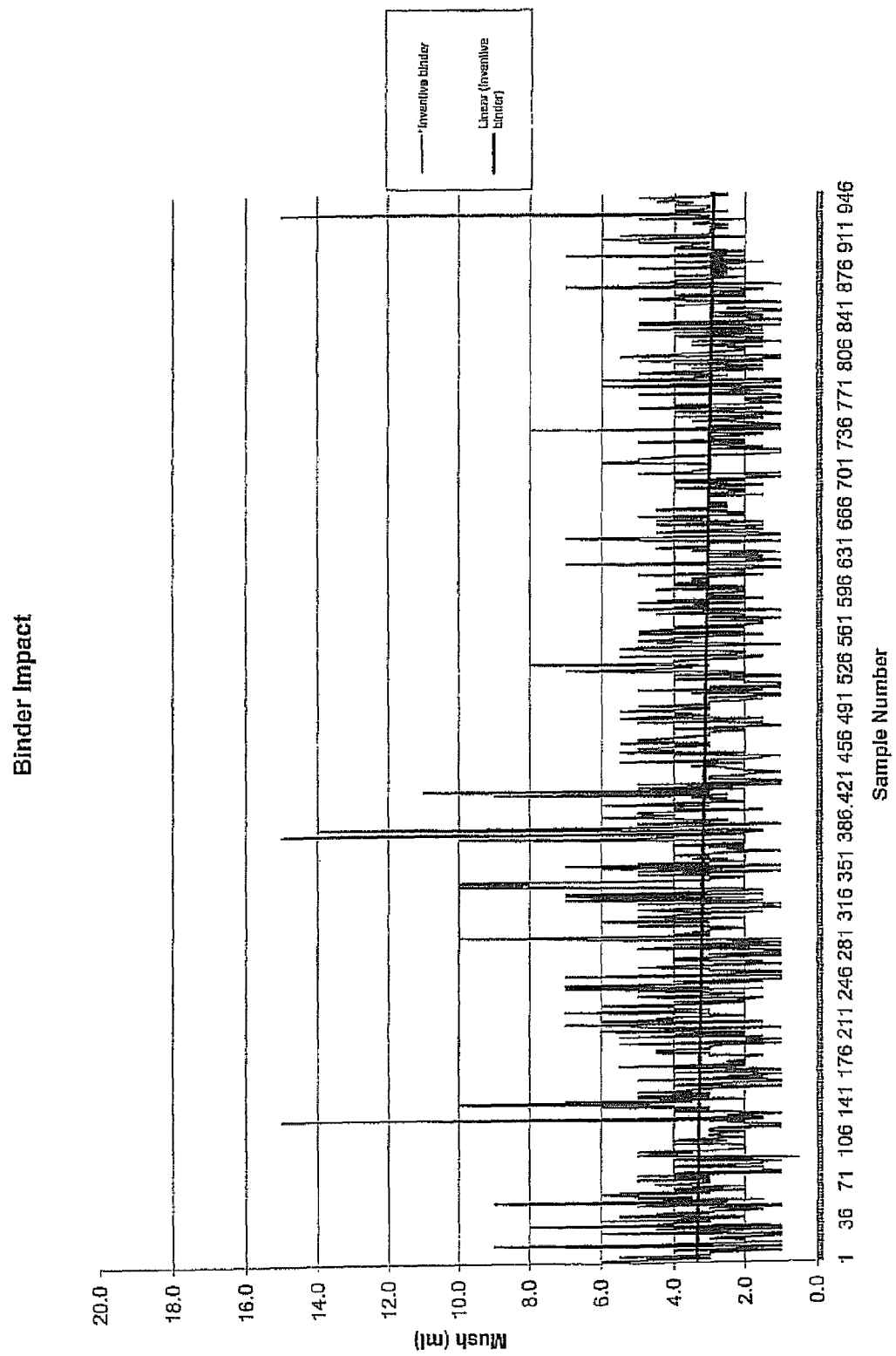
FIG. 1 is a graph depicting the results of the mush test for salt products formed according to the invention.

The present invention is concerned with a new binder for use in forming a salt product such as compacted salt. The binder comprises an aqueous mixture of sorbitol and an alkali metal phosphate, and in one embodiment consists essentially of sorbitol, an alkali metal phosphate, and water. Examples of preferred alkali metal phosphates include those selected from the group consisting of sodium phosphates, disodium phosphates, sodium polyphosphates, potassium phosphates, potassium polyphosphates, and mixtures thereof. A particularly preferred alkali metal phosphate is sodium hexametaphosphate.

The weight ratio of sorbitol to alkali metal phosphate in the binder is preferably from about 3:2 to about 20:1, more preferably from about 3:2 to about 10:1, and even more preferably from about 3:2 to about 5:1.

The preferred method of forming the binder involves mixing an aqueous solution comprising the alkali metal phosphate with an aqueous sorbitol solution. This can be carried out under ambient conditions. The alkali metal phosphate solution preferably comprises from about 30% to about 60% by weight alkali metal phosphate, and more preferably from about 40% to about 50% by weight alkali metal phosphate, based upon the total weight of the alkali metal phosphate solution taken as 100% by weight. The sorbitol solution preferably comprises from about 55% to about 85% by weight sorbitol, and more preferably from about 65% to about 75% by weight sorbitol, based upon the total weight of the sorbitol solution taken as 100% by weight. These percentages by weight will typically result in a binder solution having a total water content of from about 30% to about 50% by weight, preferably from about 35% to about 45% by weight, and even more preferably about 40% by weight, based upon the total weight of the binder taken as 100% by weight.

The inventive binder has a number of advantageous properties. For example, the binder has a freezing point that is significantly lower than prior art binders. The binder has a freezing point of less than about 25° F., more preferably less than about 22° F., and even more preferably less about 19° F. Such a low freezing point decreases or even eliminates the need for heaters when storing the binder and/or the final salt product containing the binder.

The inventive binder also has a very low viscosity, which simplifies the equipment required to use the binder. More specifically, the viscosity (determined with a Brookfield Viscometer; 60 rpm, #2 spindle) of the inventive binders at 20° C. (68° F.) is less than about 30 cP, preferably less than about 20 cP, and more preferably from about 5 cP to about 20 cP.

The binder can be used to prepare a salt product using conventional manufacturing methods. A preferred method involves a compaction process. In this process, the inventive binder is contacted with salt crystals, such as salt crystals as they are discharged from an evaporator. Typical salts include those selected from the group consisting of sodium chloride, potassium chloride, and mixtures thereof.

It is preferred that the salt crystals are exposed to (and more preferably heated to) temperatures of from about 130° F. to about 220° F., and more preferably from about 150° F. to about 200° F., prior to and/or during contact of the salt crystals with the binder. The binding agent is contacted with the salt crystals at a level of from about 0.01% to about 5% by weight, preferably from about 0.01% to about 3.5% by weight, and more preferably from about 0.01% to about 2% by weight binder, based upon the total weight of the salt crystals taken as 100% by weight.

The binder-coated salt crystals are then conveyed to a compactor. Any conventional compacting equipment capable of subjecting the binder-coated salt crystals to the necessary temperatures and pressures described herein would be suitable in the present invention. One preferred type of compactor comprises two rolls that are closely spaced so that a small gap or "pinch point" is formed between the rolls. The salt crystals are fed into that gap, which applies pressure to the salt crystals.

Upon passing through the compactor, the temperature of the binder-coated salt crystals increases by at least about 10°

F., and more preferably from about 10° F. to about 20° F. While being passed through the compactor, the binder-coated crystals experience pressures of at least about 1,800 psig, preferably at least about 2,000 psig, more preferably from about 2,000 psig to about 2,500 psig, and even more preferably from about 2,000 psig to about 2,300 psig. During the compacting process, the combination of the temperature, pressure, and moisture causes the salt to rapidly dissolve and recrystallize into a single crystal, emerging as a compacted sheet.

The binder functions to transport the moisture substantially uniformly into the sheet during compaction, thus improving the strength and durability of the final product. The salt sheet is an intermediate shape or body in this process, that will ultimately be passed through a sheet breaker or crusher to form salt pieces that can be bagged and sold. Both the intermediate salt sheet and the final broken salt pieces comprise sorbitol and the alkali metal phosphate substantially uniformly dispersed or intermixed through the sheet and among the salt.

The final salt pieces will be in the form of a self-sustaining body, and will typically comprise from about 0.01% to about 1% by weight sorbitol, and preferably from about 0.01% to about 0.04% by weight sorbitol, based upon the total weight of the salt pieces taken as 100% by weight. Furthermore, the salt pieces will typically comprise from about 0.01% to about 1% by weight alkali metal phosphate, and preferably from about 0.01% to about 0.04% by weight alkali metal phosphate, based upon the total weight of the salt pieces taken as 100% by weight. The moisture content of the salt pieces will preferably be from about 0.03% to about 0.2% by weight, preferably from about 0.04% to about 0.14% by weight, and more preferably from about 0.05% to about 0.09% by weight, based upon the total weight of the salt pieces taken as 100% by weight.

The inventive salt product has a number of significant advantages over prior art salt products. For example, the inventive salt is durable and exhibits low mushing. When subjected to the "mush test" as described below, the present invention will exhibit a mushing of less than about 8 mL, more preferably less than about 7 mL, and even more preferably less than about 6 mL, when the mushing test is repeated on a salt product batch 5 times and averaged.

The salt products of the present invention can be used in conventional water softeners according to the instructions for the particular water softener. This involves contacting the water to be treated with resin in the softener that is regenerated with the salt product so that the metal ions of the salt will be replaced with the undesirable ions present in the water. The amount of salt used to regenerate the resin in the water softener will depend upon the hardness level of the water, but the quantity will typically be from about 0.1% to about 6% by weight salt product, based upon the total weight of the water taken as 100% by weight.

EXAMPLES

The following examples set forth preferred methods in accordance with the invention. It is to be understood, however, that these examples are provided by way of illustration and nothing therein should be taken as a limitation upon the overall scope of the invention.

Example 1

Preparation and Analysis of Inventive Binder

A 45% SHMP (sodium hexametaphosphate, obtained from Innophos) solution was prepared by mixing 525 g of SUMP with 1 liter of water. Sorbitol (containing 30% water) was obtained from SPI Polyols. The SUMP solution and sorbitol were mixed at a volume ratio of 1.9 SHMP solution to 1 part sorbitol to form the inventive binder.

The final binder had a freezing point (ASTM No. D 1177) of 19° F. (−7-22° C.) whereas sorbitol freezes or crystallizes at 59.8° F. (15.44° C.) and a 45% solution of SHMP freezes at 28.9° F. (−1.72° C.). This is a significant and unexpected decrease in freezing point, and it decreases or even eliminates the need for heaters when storing the binder and/or the final salt product containing the binder.

The viscosity of the inventive binder was determined using a Brookfield Viscometer (60 rpm, #2 spindle). The inventive binder's viscosity at 20° C. (68° F.) was 17 cP, whereas the viscosity of sorbitol was 157 cP and of a 45% solution of SHMP was 8 cP at this same temperature. This low viscosity was unexpected in light of the high viscosity of sorbitol and is advantageous because it allows for the use of simplified equipment.

Example 2

Preparation of Salt Including Inventive Binder

A compacted salt containing the inventive binder of Example 1 was prepared by using a conventional compacting process. More specifically, NaCl crystals were conveyed from an evaporator, at a temperature of about 150° F. The binder of Example 1 was then contacted with the salt crystals, and the binder-coated salt product was conveyed to a 2-roll compactor (as described previously). During compaction, the crystals were exposed to 2,000 psi of pressure, and the temperature of the salt crystals increased by about 10-20° F. A sheet of recrystallized salt (with the binder interspersed with the salt) exited the compactor and was contacted with a sheet breaker, which broke the sheet into salt pieces. The pieces were screened so that all pieces ¼" or larger were bagged, while all pieces smaller than ¼" were recycled back to the beginning of this process.

Example 3

Analysis of Salt Including Inventive Binder

1. Mush Test

A "mush test" was performed on this salt product. In this test, material was first screened so that the pieces tested had a minimum size of ¼" and a maximum size of 1.25". Next, 861 g of the salt was placed in a "V" cone (Patterson-Kelly "V" cone-type mixer), and 1,000 mL of water were added. The "V" cone was sealed and rotated at a speed of 23 rpm for 2 hours at ambient temperatures (about 70° F.), resulting in a saturated brine solution containing approximately 500 g of excess salt.

The saturated brine solution was then decanted from the "V" cone into a beaker and retained for later washing. The solution was poured into an 8-mesh screen with a funnel attached at the bottom, positioned upon an Imhoff cone. The previously-decanted, saturated brine solution was poured over the top of the compacted product to wash any fine material into the Imhoff cone. This brine solution washing step was repeated two more times, and then the fines were allowed to settle for 30 minutes. After settling, a reading of the level of fines was taken on the Imhoff cone. An amount of less than about 8 mL is considered acceptable. This procedure was repeated multiple times, and the results are shown in the graph of FIG. 1.

Figure 2:
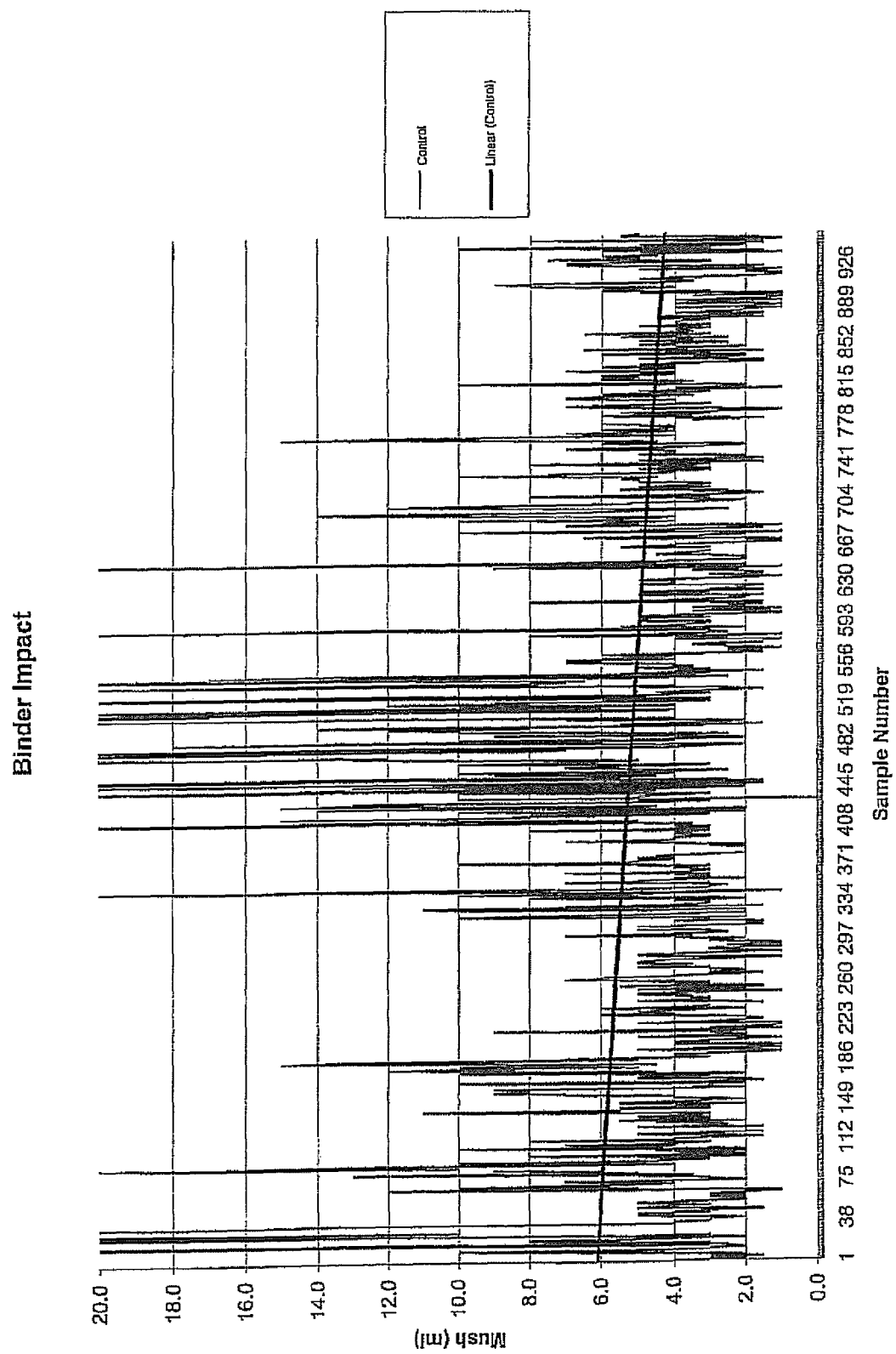
FIG. 2 is a graph depicting the results of the mush test for a prior art salt product.

The same mush test was performed multiple times on a control sample of compacted NaCl salt (i.e., one that did not include the inventive binder, but instead used sorbitol as the binder). FIG. 2 shows these results. By comparing FIGS. 1 and 2, it can be seen that a dramatic improvement was achieved by the salt with the inventive binder over the control. That is, the mL retained in the screen was significantly decreased by using the inventive binder.

table indicate the strength of the tablet by giving the pressure at which the tablet broke. In particular, the average break value at 24 hours is indicative of initial tablet strength (the higher the number, the stronger the tablet). The results below show that the tablets prepared from the salt product comprising the inventive binder was at least 10% stronger than products comprising only sorbitol or only SHMP.

The durability of the product in an aqueous environment is assessed by comparing the "break values" that occurred after 48 or 96 hours of soaking in water. Again, the average obtained when using the inventive binder is improved over the control products.

TABLE 1

TABLETS FORMED AT 5,000 PSIG

| BINDER | | SORBITOL | | SHMP | | INVENTIVE BINDER | |
|---|---|---|---|---|---|---|---|
| | Sample # | 24 hrs[A] | 96 hrs | 24 hrs | 96 hrs | 24 hrs | 96 hrs |
| Break Value (psig) | 1 | 22 | 12 | 16 | 13 | 18 | 17 |
| | 2 | 18 | 11 | 18 | 14 | 28 | 15 |
| | 3 | 24 | 12 | 18 | 14 | 22 | 11 |
| | 4 | 24 | 13 | 18 | 15 | 20 | 17 |
| | 5 | 14 | 12 | 22 | 14 | 26 | 16 |
| | Average | 20.4 | 12.0 | 18.4 | 14.0 | 22.8 | 15.2 |
| | Sample # | 24 hrs | 96 hrs | 24 hrs | 96 hrs | 24 hrs | 96 hrs |
| Break Value | 6 | 18 | 14 | 14 | 17 | 20 | 18 |
| | 7 | 16 | 12 | 15 | 13 | 20 | 17 |
| | 8 | 19 | 15 | 16 | 15 | 18 | 18 |
| | 9 | 17 | 15 | 20 | 11 | 20 | 16 |
| | 10 | 17 | 15 | 21 | 17 | 21 | 18 |
| | Average | 17.4 | 14.2 | 17.2 | 14.6 | 19.8 | 17.4 |

TABLETS FORMED AT 3,500 PSIG

| BINDER | | SORBITOL | | SHMP | | INVENTIVE BINDER | |
|---|---|---|---|---|---|---|---|
| | Sample # | 24 hrs | 48 hrs | 24 hrs | 48 hrs | 24 hrs | 48 hrs |
| Break Value | 11 | 18 | 12 | 11 | 13 | 14 | 15 |
| | 12 | 14 | 13 | 21 | 10 | 20 | 12 |
| | 13 | 15 | 12 | 12 | 10 | 21 | 17 |
| | 14 | 13 | 13 | 11 | 13 | 16 | 15 |
| | 15 | 15 | 12 | 11 | 12 | 17 | 17 |
| | Average | 15.0 | 12.4 | 13.2 | 11.6 | 17.6 | 15.2 |

[A]Hours soaked in water.

2. Evaluation of Salt Strength and Durability

The salt product prepared in Example 2 was formed into tablets in order to evaluate the salt's strength and durability. This was accomplished by placing a quantity of the salt into a tablet press and subjecting it to either 3,500 psig or 5,000 psig until broken (approximately 2 seconds). The resulting tablets were 28 mm in diameter and 7.5 mm thick. They each weighed approximately 9-10 g.

Two control salt (NaCl) products were made according to the compacting process described in Example 2, except that either sorbitol or SHMP was substituted for the inventive binder. The control salt products were then used to form tablets using the same process as that described above with respect to the tablets formed from inventive salt product.

Each of the prepared tablets was soaked in water for a period of 24, 48, and/or 96 hours, and then they were broken by placing them in a crushing apparatus that applied a measurable pressure to each tablet. The results from this testing are set forth in Table 1. The "break values" set forth in the

I claim:

1. A binder useful for forming a salt product, said binder consisting essentially of an aqueous mixture of sorbitol, an alkali metal phosphate, and water, wherein the weight ratio of sorbitol to alkali metal phosphate is from about 3:2 to about 20:1.

2. The binder of claim 1, wherein said alkali metal phosphate is selected from the group consisting of sodium phosphates, disodium phosphates, sodium polyphosphates, potassium phosphates, potassium polyphosphates, and mixtures thereof.

3. A salt product consisting essentially of sorbitol and an alkali metal phosphate intermixed with a salt, wherein said salt is selected from the group consisting of sodium chloride, potassium chloride, and mixtures thereof.

4. The product of claim 3, wherein said salt product is in the form of a self-sustaining body.

5. The product of claim 3, wherein said alkali metal phosphate is selected from the group consisting of sodium phosphates, disodium phosphates, sodium polyphosphates, potassium phosphates, potassium polyphosphates, and mixtures thereof.

6. The product of claim 3, wherein the weight ratio of sorbitol to alkali metal phosphate is from about 3:2 to about 20:1.

7. The product of claim 3, wherein said salt product comprises from about 0.01% to about 1% by weight sorbitol, based upon the total weight of the salt product taken as 100% by weight.

8. The product of claim 3, wherein said salt product comprises from about 0.01% to about 1% by weight alkali metal phosphate, based upon the total weight of the salt product taken as 100% by weight.

9. A method of treating water, said method comprising contacting the water with a resin regenerated by the salt product of claim 3.

10. The method of claim 9, wherein said contacting with water comprises softening the water.

11. A binder useful for forming a salt product, said binder consisting essentially of an aqueous mixture of sorbitol and an alkali metal phosphate, wherein said alkali metal phosphate is sodium hexametaphosphate, and wherein the weight ratio of sorbitol to alkali metal phosphate is from about 3:2 to about 20:1, said binder having a freezing point of about 25° F. or lower.

* * * * *